(12) United States Patent
Gorecki et al.

(10) Patent No.: US 7,346,119 B2
(45) Date of Patent: Mar. 18, 2008

(54) SYSTEM AND METHOD FOR HIGH SPEED DIGITAL SIGNALING

(75) Inventors: James Gorecki, Hillsboro, OR (US); John T. Stonick, Portland, OR (US); Un-Ku Moon, Corvallis, OR (US)

(73) Assignee: Synopsys, Inc., Mountain View, CA (US)

( * ) Notice: Subject to any disclaimer, the term of this patent is extended or adjusted under 35 U.S.C. 154(b) by 661 days.

(21) Appl. No.: 10/414,951

(22) Filed: Apr. 16, 2003

(65) Prior Publication Data

US 2003/0194016 A1 Oct. 16, 2003

Related U.S. Application Data

(62) Division of application No. 10/222,122, filed on Aug. 16, 2002, now Pat. No. 7,230,979.

(60) Provisional application No. 60/313,454, filed on Aug. 20, 2001, provisional application No. 60/313,214, filed on Aug. 17, 2001.

(51) Int. Cl.
*H03C 5/00* (2006.01)

(52) U.S. Cl. ............. 375/268; 370/533; 375/219; 375/353; 332/115

(58) Field of Classification Search ........... 370/276, 370/289, 291, 395.53; 375/219, 259, 268, 375/294

See application file for complete search history.

(56) References Cited

U.S. PATENT DOCUMENTS 4,896,334 A * 1/1990 Sayar .................... 375/293
4,924,492 A 5/1990 Gitlin et al.
5,301,187 A * 4/1994 Reum .................... 370/276
5,528,625 A 6/1996 Ayanoglu et al.
5,991,308 A * 11/1999 Fuhrmann et al. ..... 370/395.53
6,169,767 B1 1/2001 Strolle et al. ............... 375/302
6,246,716 B1 6/2001 Schneider
6,253,345 B1 6/2001 Agazzi et al.
6,259,680 B1 7/2001 Blackwell et al.

FOREIGN PATENT DOCUMENTS

WO WO 97/34397 9/1997
WO WO 00/16525 3/2000

OTHER PUBLICATIONS

"IC-Friendly Line Codes for Direct-Conversion Receivers", by Dongling Pan et al., Radio and Wireless Conference, 2000 IEEE Sep. 10-13, XP010521029, pp. 79-81.
"Binary Code Suitable for Line Transmission", by Griffith J M, Electronic Letters, IEE Stevenage, GB, vol. 5, No. 4, Feb. 20, 1969, XP000761084, pp. 79-81.

* cited by examiner

*Primary Examiner*—David C. Payne
*Assistant Examiner*—Adolf DSouza
(74) *Attorney, Agent, or Firm*—Park, Vaughan & Fleming LLP

(57) ABSTRACT

The present invention relates in general to a method, apparatus, and article of manufacture for providing high-speed digital communications through a communications channel. In one aspect, the present invention employs adaptive or adjustable equalization circuitry and techniques in the transmitter and/or receiver to enhance the system performance of, for example, a system using the PAM-4 coding.

20 Claims, 13 Drawing Sheets

FIGURE 7

| Xmit Bit Pattern | Q_Code RDS >0 | Q_Code RDS <0 | Code Use |
|---|---|---|---|
| 0 (00) | -3 -1 +1 +3 +1 | +3 +1 -1 -3 -1 | Backchannel |
| 21 (15) | +3 +1 +1 +3 -1 | -3 -1 -1 -3 +1 | DC Correction |
| 22 (16) | +3 +3 -1 +3 -1 | -3 -3 +1 -3 +1 | DC Correction |
| 167 (A7) | -3 -1 +3 +3 +1 | -3 +1 +3 +1 | Ordinary Pattern |
| 168 (A8) |  |  | Ordinary Pattern |
| 255 (FF) |  | -3 -3 -1 +3 +1 | Ordinary Pattern |

FIGURE 10 : Master/Slave Selection Flow Diagram

SYSTEM AND METHOD FOR HIGH SPEED DIGITAL SIGNALING

CROSS-REFERENCE TO RELATED APPLICATIONS

This patent application is a divisional application of application Ser. No. 10/222,122 (still pending), filed Aug. 16, 2002.

This application claims priority to U.S. Provisional Application Ser. No. 60/313,454, entitled "Transceiver System for High Speed Digital Signaling", filed Aug. 20, 2001, and U.S. Provisional Application Ser. No. 60/313,214, entitled "Transceiver Apparatus and Method", filed Aug. 17, 2001. The contents of these provisional applications are incorporated, in their entirety, by reference herein.

This application is related to U.S. Provisional Patent Application Ser. No. 60/313,455, entitled "Automatic Slicer Level Adaption", filed Aug. 20, 2001; U.S. Provisional Patent Application Ser. No. 60/313,456, entitled "Variable Rate Sub-Channel Using Block Code RDS", filed Aug. 20, 2001; U.S. Provisional Patent Application Ser. No. 60/313,478, entitled "Variable Delay FIR Equalizerfor Serial Baseband Communications", filed Aug. 20, 2001; U.S. Provisional Patent Application Ser. No. 60/313,477, entitled "Crosstalk Management for High-Speed Signaling Links", filed Aug. 20, 2001; and U.S. Provisional Patent Application Ser. No. 60/313,476, entitled "Method and Apparatus for Encoding and Decoding Digital Communications Data", filed Aug. 20, 2001. The aforementioned applications are hereby incorporated by reference, in their entirety, herein.

This application is also related to non-provisional patent applications that claim priority to one or more of the above-referenced provisional patent applications. These non-provisional patent applications are entitled "System and Method for Providing Slicer Level Adaption", filed Aug. 16, 2002 (Ser. No. 10/222,073); "System and Method for Embedding a Sub-Channel in a Block Coded Data Stream", filed Aug. 16, 2002 (Ser. No. 10/222,071); "System and Method for Providing Variable Delay FIR Equalizer for Serial Baseband Communications", filed Aug. 16, 2002 (Ser. No. 10/222,166); "System and Method for Providing Crosstalk Management for High-Speed Signaling Links" filed Aug. 16, 2002 (Ser. No. 10/222,072); and "Method and Apparatus for Encoding and Decoding Digital Communications Data", filed Aug. 16, 2002 (Ser. No. 10/222,254). The aforementioned non-provisional applications are hereby incorporated by reference, in their entirety, herein.

BACKGROUND OF THE INVENTION

This application relates in general to a method, apparatus, and article of manufacture for providing high speed digital communications through a backplane communications channel, and more particularly to a method, apparatus, and article of manufacture for providing a transceiver for, and system and method implementing a transceiver in a high speed digital signaling across a communications channel, for example, a backplane.

In conventional systems, communications across the backplane was accomplished using a Serializer-Deserializer ("SERDES") and binary coding. While SERDES based systems employing binary coding are relatively straightforward to implement because of its simplicity, such systems may have a bandwidth limitation, which make them more difficult to implement as the density of bits per trace increase.

In order to meet the increase in the demand of the transfer rate of data, conventional systems also employ a multi-level pulse amplitude modulation (PAM-n) scheme that encodes a plurality of bits of data into or onto a signal in which the symbols are represented as a set of signal levels between a minimum and maximum set of signal levels. One advantage of utilizing multi-level PAM, as opposed to binary, is that fewer symbols per second need to be transmitted to convey a given number of bits per second. This reduces the frequency content of the transmitted signal.

A shortcoming of employing multi-level PAM signaling is a reduction in voltage margin. The reduction in voltage margin creates, among other things, the recovery or detection of the original signal more difficult and therefore recovery of the original symbol(s) more difficult. For example, detecting the level of a PAM-4 signaling technique requires discrimination between four levels rather than two levels in a binary signaling technique.

Moreover, while PAM-4 signaling allows for a two-fold reduction in the symbol rate for a given channel bit rate (relative to binary), systems employing PAM-4 tend to observe or experience a two-thirds smaller eye opening in terms of the voltage, and up to a two times larger eye opening in terms of the time domain relative to conventional binary signaling systems carrying the same aggregate bit rate. As such, nearly exact or precise equalization to a zero intersymbol interference pulse shape may be required to eliminate errors.

Thus, there is a need for a communications system for a backplane that addresses the higher density of bits per trace environments.

SUMMARY OF THE INVENTION

The present invention relates in general to a method, apparatus, and article of manufacture for providing high-speed digital communications across a communications channel, for example, a backplane. In one aspect, the present invention employs adaptive or adjustable equalization circuitry and techniques in the transmitter and/or receiver to enhance the system performance of, for example, a system using the PAM-4 coding.

In another aspect, the present invention is a system and technique that overcomes the limitations of conventional communications backplane systems addressing signal distortion arising from skin effect, dielectric loss, reflections and/or a corresponding decrease in timing margin. The present invention, in one aspect, overcomes the difficulties associated with increasing the throughput per trace in the backplane by utilizing 4-level Pulse Amplitude Modulation technique (PAM-4) to encode 2 bits per symbol. In another aspect, the present invention incorporates equalizer structure and/or functionality in the transmitter and/or receiver to address some or all of the aforementioned distortions.

In short, systems employing the present invention(s) may exhibit significant increases in performance in backplane environments by implementing a PAM-4 coding and/or equalization structure/techniques pursuant to the present invention.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically illustrated are contemplated and within the scope of the present invention.

FIG. 7 illustrates a set of example Q Codes used for transmitted bit patterns in a communications channel according to another embodiment of the present invention;

DETAILED DESCRIPTION

Figure 1:
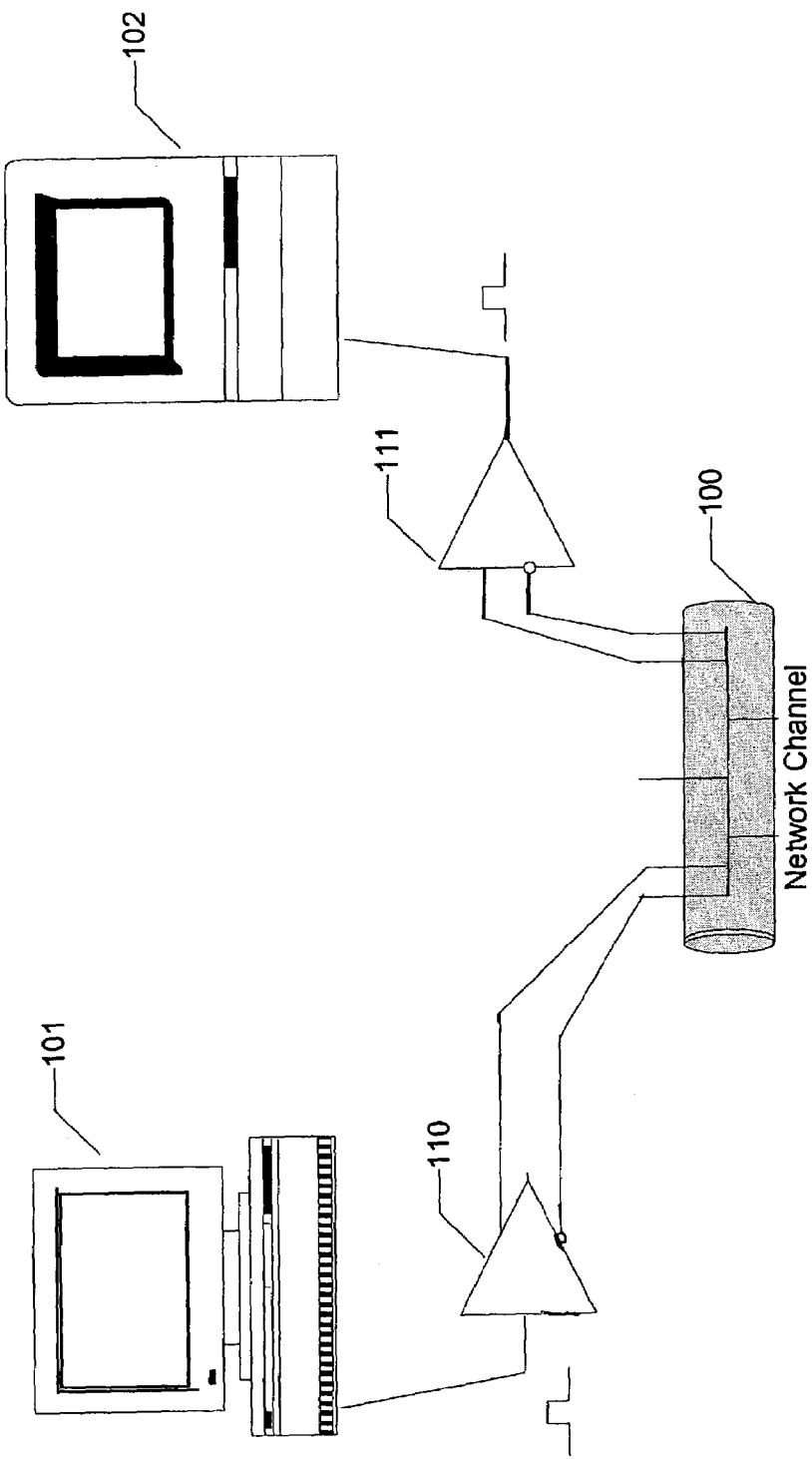
FIG. 1 illustrates an exemplary communications channel between two digital processing devices according to one embodiment of the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and changes may be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise. The term "connected" means a direct connection between the items connected, without any intermediate devices or modules. The term "coupled" means either a direct connection between the items connected, or an indirect connection through one or more passive or active intermediary devices or modules. The term "circuit" means either a single component or a multiplicity of components, either active and/or passive, that are coupled together to provide or implement a desired function. The term "signal" means at least one current, voltage, or data signal. Referring to the drawings, like numbers indicate like parts throughout the views. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

FIG. 1 illustrates an exemplary communications channel between two digital processing devices. Digital processing devices 101 and 102, for example personal computers or data communications devices, communicate with each other by transmitting digital signals between or to each other through communications channel 100. A digital representation of the information to be transmitted is encoded and transformed into an electronic signal capable of passing through communications channel 100. The signal is transmitted by transmitter 110 to receiver 111. The received signal, which may be distorted relative to the signal transmitted into channel 100, is processed and decoded (by the receiver 111) to reconstruct a digital representation of the information sent by the transmitting or sending device (i.e., the transmitter 110).

The communications channel 100 may be, for example, constructed using one or more cables, wires, traces or the like, or may be part of a backplane, or may be a wireless communications medium through which the signal passes from transmitter 110 to receiver 111. One skilled in the art will recognize that any such communications media, when used in conjunction with a corresponding transmitter/receiver pair that is appropriate for a particular medium, may be used to construct a communications channel that may be implemented with the present invention. Indeed, all types of channels of communication (i.e., communication channels), whether now known or later developed, are intended to be within the scope of the present invention.

Figure 2:
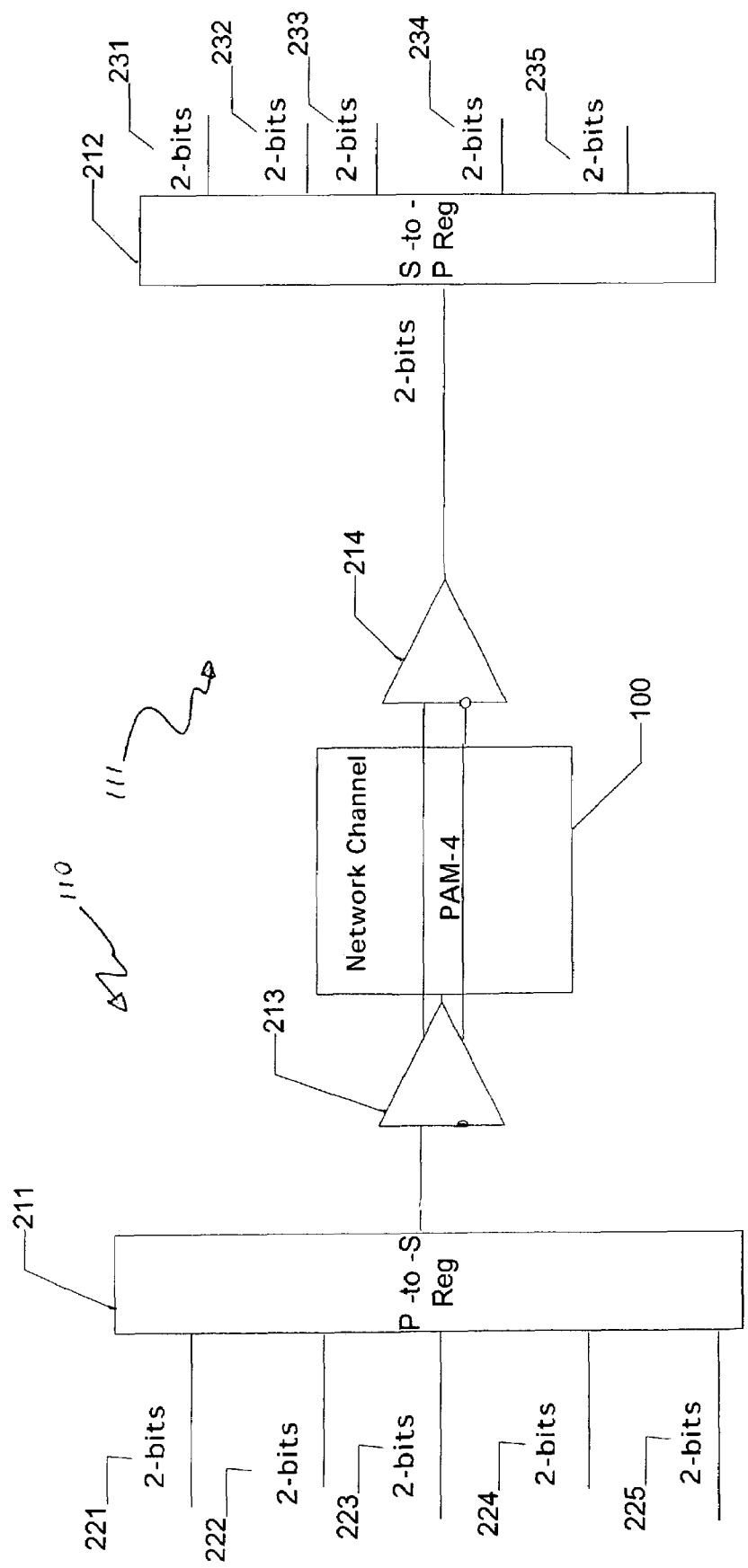
FIG. 2 illustrates an exemplary communications channel according to an embodiment of the present invention.

FIG. 2 illustrates an exemplary communications channel according to one embodiment of the present invention. The communications channel 100 enables or facilitates transmission of information between associated pairs of transmitters 110 and receivers 111. In one embodiment, transmitter 110 sends two bits of data for each symbol transmitted to receiver 111. A ten bit word is loaded into parallel-to-serial register 211 with the output of the register being a two bit pair that is transmitted through channel 100. Once received, the sequence of two bit codes are loaded into serial-to-parallel register 212 to reconstruct the ten bit word.

In this particular embodiment, the transmitter and receiver pair employ a PAM-4 communications technique to send the two bits of data through channel 100. Each transmitter and receiver pair operates in the same manner; that is, each pair sends data through the channel in a serial fashion that packages two bits into one symbol. Five successive symbols are associated with each eight bit data byte. The additional overhead associated with this form of encoding is used to ensure adequate symbol crossings, necessary for timing recovery, and to provide DC balance on the line.

Figure 3:
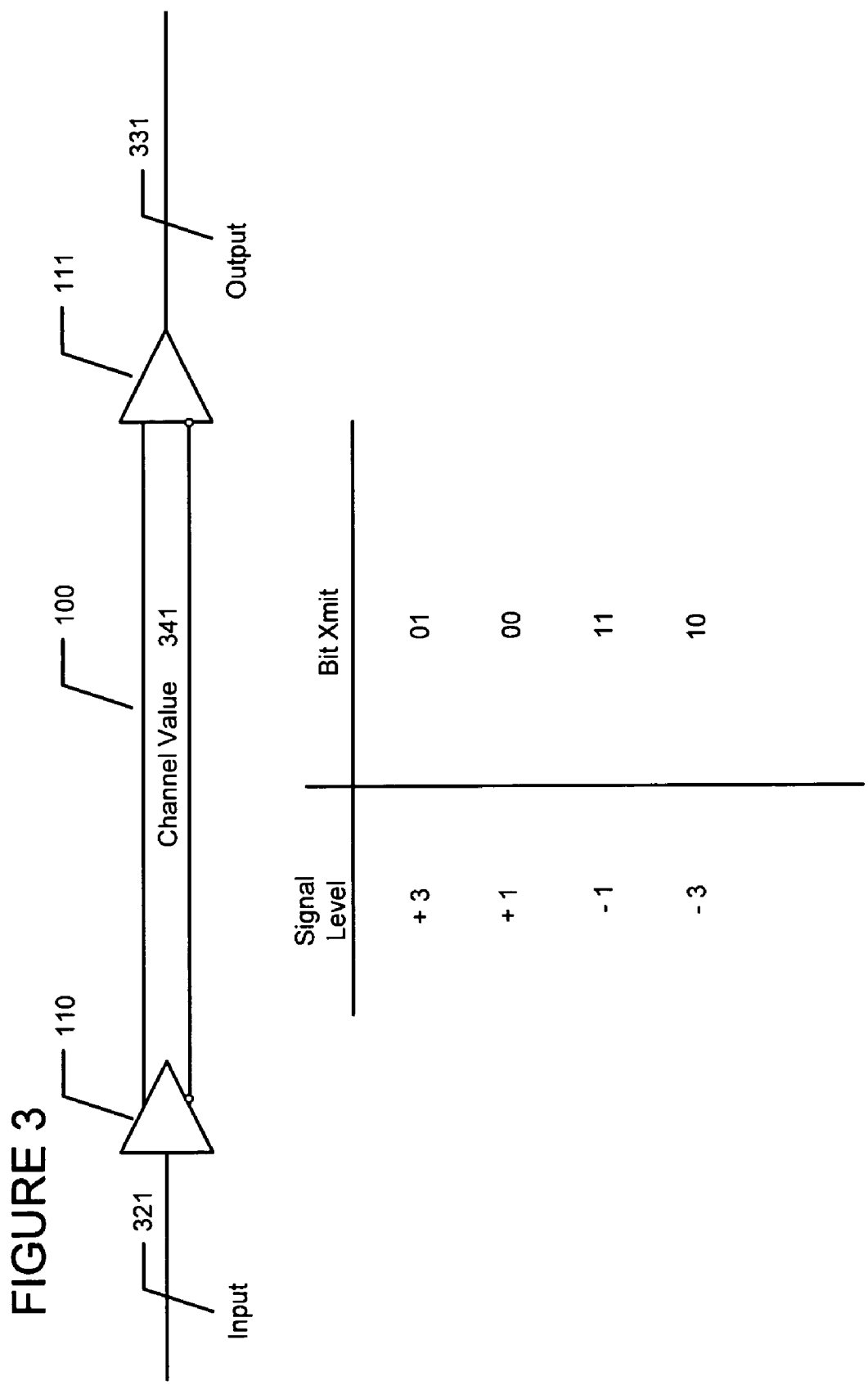
FIG. 3 illustrates a portion of a communications channel implementing PAM-4 symbol encoding according to one embodiment of the present invention.

FIG. 3 illustrates a portion of a communications channel illustrating PAM-4 symbol encoding in accordance with an embodiment of the present invention. In this embodiment, transmitter 110, using a PAM-4 communications technique, transmits one of four signal values (i.e., channel value 341) to receiver 111. The channel value 341 represents a single communications symbol. The four signal values represent the four possible combinations of encoded values for two bits of digital data. As mentioned above, five successive symbols are associated with each eight bit data byte.

With continued reference to FIG. 3, the input data 321 is separated into two bit groups that are reconstructed as output data 331 to allow the digital representation of data input into the channel to be extracted as output data from the channel.

The communications system typically includes many sets of unidirectional transmitter and receiver pairs connected to communications channel 100. These pairs simultaneously transmit data across channel 100 in both directions. Thus, from a system level perspective, there are many transmitter/receiver pairs in simultaneous operation, for example, 8 or 9 transmitter/receiver pairs communicating across a communications channel.

It should be noted that other modulation formats that encode fewer or more bits per symbol codes may be employed in the system and method of the present invention. Moreover, other communications mechanisms that use different encoding tables, other than four levels, may also be used. For example, PAM-5, PAM-8, PAM-16, CAP, wavelet modulation and other encoding rates such as 16B9Q or 9B5Q may be implemented in the present invention. The system and techniques described herein are in fact applicable to any and all modulation schemes including but not limited to PAM-4 encoding.

Figure 4:
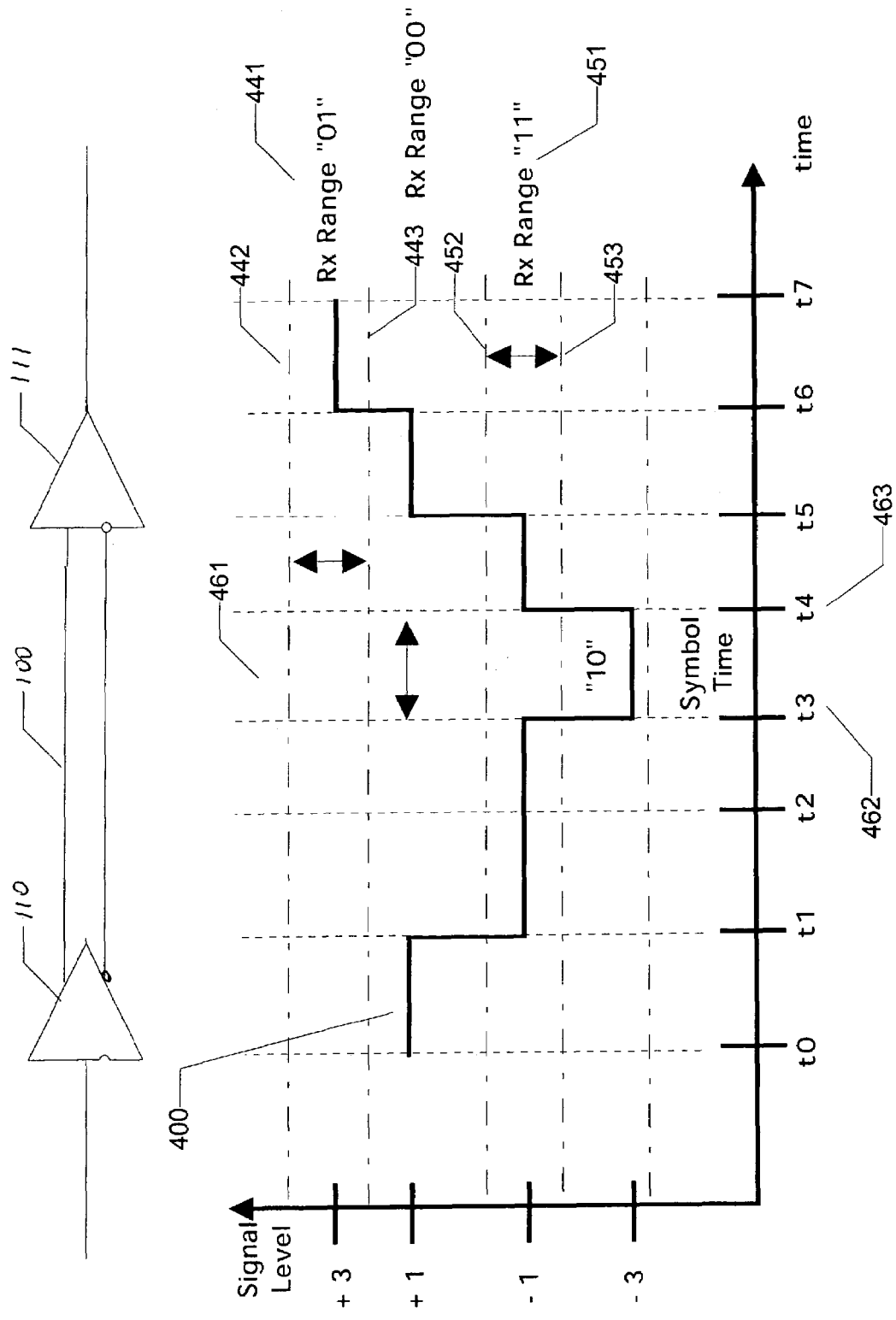
FIG. 4 illustrates an idealized time-varying communications signal for a portion of a communications channel according to one embodiment of the present invention.

FIG. 4 illustrates an idealized time-varying communications signal for a single line from a communications channel according to an embodiment of the present invention. As data passes between transmitter 110 and receiver 111, an idealized representation of the signal 400 is seen on channel 100. Two bits of data are sent during each symbol time period 461, which is defined to be a time period between a starting 462 and an ending 463 time for a symbol. Of course, the ending time 463 for a symbol is typically also the starting time for the next symbol. During a symbol time 461, a particular channel value, as seen as a signal voltage, is observable on channel 100. Ideally, transmitter 110 will send one of four voltage values, i.e., +3, +1, −1 or −3, during each symbol time 461. The receiver 111 observes the voltage during each symbol time period 461 to determine which of the four voltages was sent by transmitter 110. The idealized time-varying waveform 400 does not illustrate the presence of any noise observed or measured at receiver 111. Additionally, the time-varying waveform shows instantaneous changes from one symbol voltage to a second symbol voltage at the start and end of a symbol time period 461.

As symbol communication rates increase, the noise and distortion observed or measured at receiver 111, as well as the rise and fall times of each symbols, are measured as an analog signal component on the symbol signal. These analog signal components become significant factors that limit the rate at which data may be communicated. At time 461, receiver 111 detects a symbol by detecting the voltage 400. In simplistic terms, a receiver 111 determines that a particular symbol was transmitted when a voltage is detected between a maximum signal level and a minimum signal level that is typically centered around or on the symbol signal level. For example, if a bit pattern "01" is transmitted, a +3 signal voltage 441 is expected to be received. The receiver 111 is expected to observe a signal level between a maximum value 442 and a minimum value 443 if the "01" bit pattern is to be recovered. Similarly, maximum value 452 and minimum value 453 are interpreted as a −1 signal level used for a bit pattern of "11".

It should be noted that the present invention(s) may be implemented using current rather than voltage as the vehicle of the information. In addition, the transmitted signal could be a differential or single-ended current drawn or forced by the transmitter and the receiver would be responsible for sensing the current draw or force. By utilizing 4 different current amplitudes (including direction of the flow of the charge), a PAM-4 signal may be constructed and implemented to practice the present invention(s).

Figure 5:
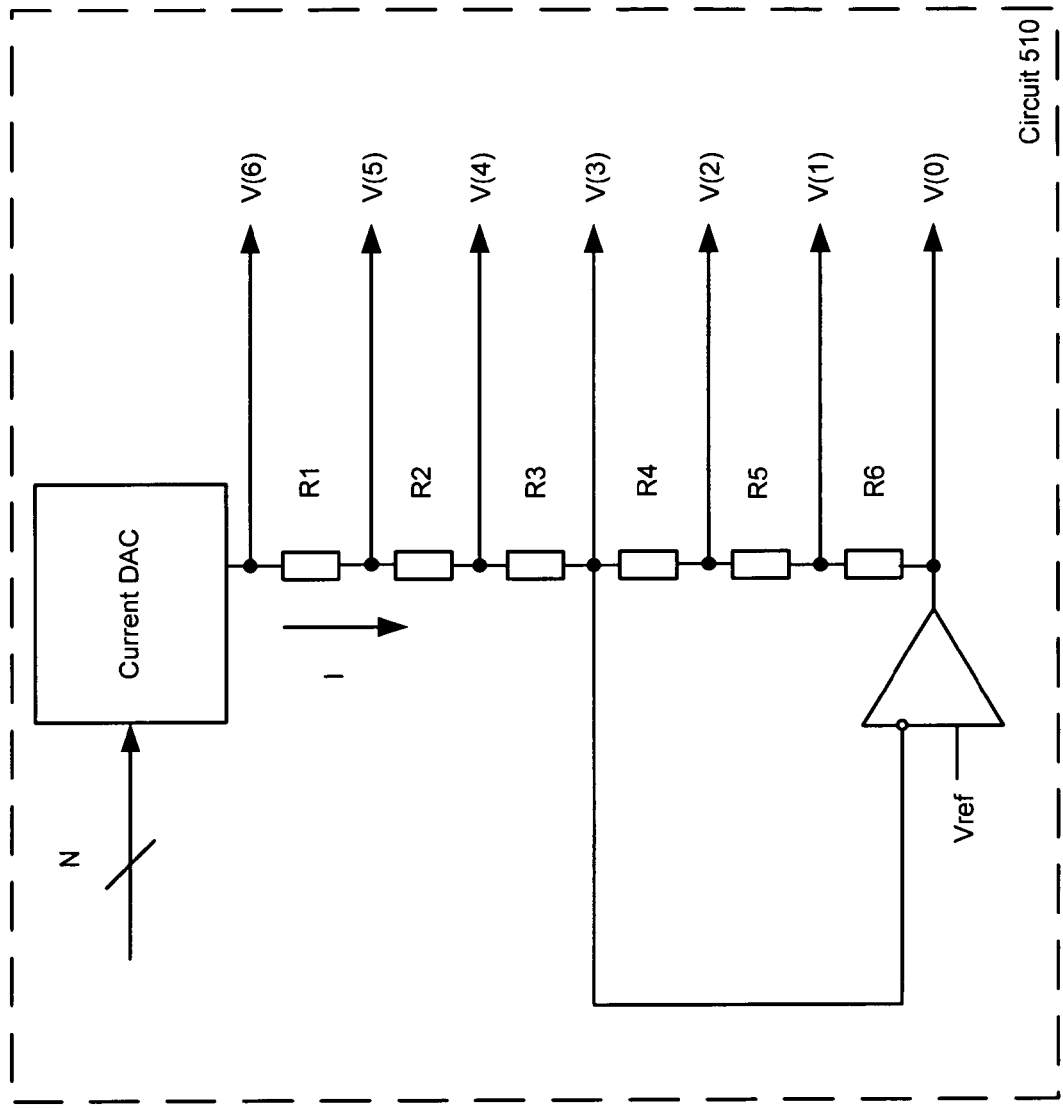
FIG. 5 illustrates an example signal slicer used within a receiver that is part of a communications channel according to another embodiment of the present invention.

FIG. 5 illustrates one possible embodiment of a reference generation circuit 510, also called an automatic slicer level (ASL) circuit, implemented within a receiver that is part of a communications system according to a second embodiment of the present invention. The reference generation circuit 510 is used to set the maximum and minimum signal values for a given symbol. The reference generation circuit 510 uses a set of resistors, R1-R6, to obtain desired voltages between a maximum and minimum voltage level. By changing the various resistor values R1-R6, any desired voltage V(0)-V(6) may be obtained. In one embodiment, these voltages may be mapped to the voltage levels in FIG. 3 as follows: V(6) to +3, V(4) to +1, V(2) to −1, and V(0) to −3. Other mappin may also be employed.

Figure 6:
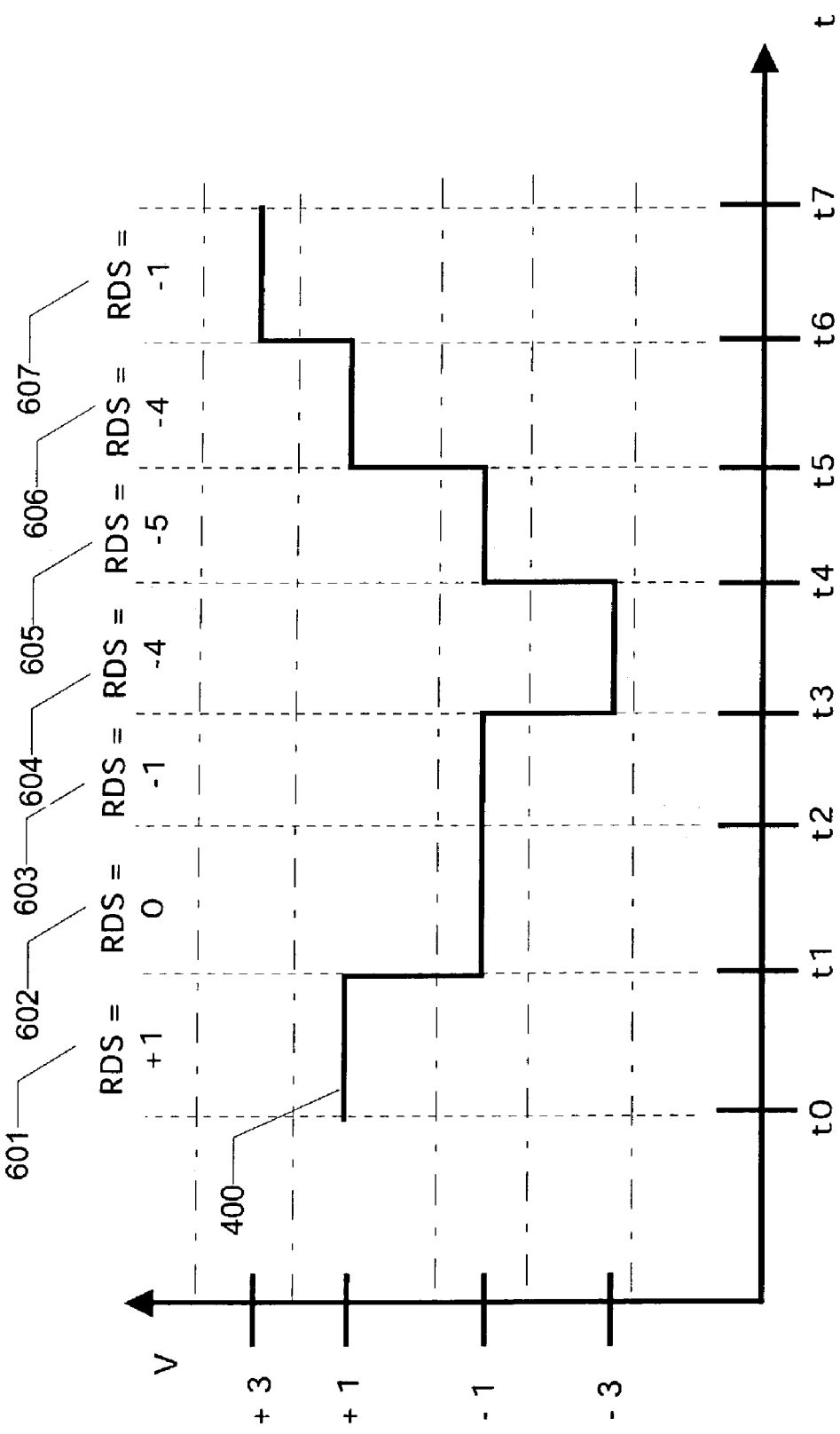
FIG. 6 illustrates a sequence of running digital sum (RDS) values corresponding to an idealized time-varying communications signal for a portion of a communications channel according to one embodiment of the present invention.

FIG. 6 illustrates a sequence of running digital sum values corresponding to an idealized time-varying communications signal for a communications system according to one embodiment of the present invention. Once again, consider the idealized time-varying waveform for a single line in a channel as previously illustrated in FIG. 4. A sequence of seven symbol time periods 601-607 are shown in this example. During each symbol time period 601-607, one of four signal levels (i.e., +3, +1, −1, and −3) is transmitted. After the 5 symbols (called a "quint" or "Q Code") associated with the user data byte are sent, the RDS (running digital sum) is sampled and used to calculate the DC balance of the line.

TABLE 1 below contains a code table that may be employed in the present invention. In this aspect of the invention, DC balance is adjusted whenever a balanced code is transmitted. Balanced codes possess two five-symbol code words (Q Codes). One of these Q codes has a positive weight (sum of symbols) while the other has an equal value but opposite sign (a negative weight). When a user data byte associated with a balanced code pair is to be transmitted, the Q Code with a weight opposite to that of the RDS of the channel is sent. This drives the RDS of the channel towards or through zero. Other code types are transmitted as is and may adversely effect the DC balance of the line. Statistically, however, the balanced codes will drive the DC content of the channel to zero.

TABLE 1

8B5QSMB Code Assignment

| Decimal Code | Q Code RDS > 0 | Q Code RDS < 0 |
|---|---|---|
| | Back Channel Code | |
| 1 | −3−1 1 3 1 | 3 1−1−3−1 |
| | RDS Balancing Codes | |
| 2 | −1 1 3 3 1 | 1−1−3−3−1 |
| 3 | 1−1 3 3 1 | −1 1−3−3−1 |
| 4 | −1 3 1 3 1 | 1−3−1−3−1 |
| 5 | 1 1 1 3 1 | −1−1−1−3−1 |
| 6 | 3−1 1 3 1 | −3 1−1−3−1 |
| 7 | 1 3−1 3 1 | −1−3 1−3−1 |
| 8 | 3 1−1 3 1 | −3−1 1−3−1 |
| 9 | −1 3 3 1 1 | 1−3−3−1−1 |

TABLE 1-continued

8B5QSMB Code Assignment

| Decimal Code | Q Code RDS > 0 | Q Code RDS < 0 |
|---|---|---|
| 10 | 1 1 3 1 1 | -1-1-3-1-1 |
| 11 | 3-1 3 1 1 | -3 1-3-1-1 |
| 12 | 1 3 1 1 1 | -1-3-1-1-1 |
| 13 | 3 1 1 1 1 | -3-1-1-1-1 |
| 14 | 3 3-1 1 1 | -3-3 1-1-1 |
| 15 | 1 3 3-1 1 | -1-3-3 1-1 |
| 16 | 3 1 3-1 1 | -3-1-3 1-1 |
| 17 | 3 3 1-1 1 | -3-3-1 1-1 |
| 18 | -1 3 3 3-1 | 1-3-3-3 1 |
| 19 | 1 1 3 3-1 | -1-1-3-3 1 |
| 20 | 3-1 3 3-1 | -3 1-3-3 1 |
| 21 | 1 3 1 3-1 | -1-3-1-3 1 |
| 22 | 3 1 1 3-1 | -3-1-1-3 1 |
| 23 | 3 3-1 3-1 | -3-3 1-3 1 |
| 24 | 1 3 3 1-1 | -1-3-3-1 1 |
| 25 | 3 1 3 1-1 | -3-1-3-1 1 |
| 26 | 3 3 1 1-1 | -3-3-1-1 1 |
| 27 | 3 3 3-1-1 | -3-3-3 1 1 |
| 28 | -1 3 3 3 1 | 1-3-3-3-1 |
| 29 | 1 1 3 3 1 | -1-1-3-3-1 |
| 30 | 3-1 3 3 1 | -3 1-3-3-1 |
| 31 | 1 3 1 3 1 | -1-3-1-3-1 |
| 32 | 3 1 1 3 1 | -3-1-1-3-1 |
| 33 | 3 3-1 3 1 | -3-3 1-3-1 |
| 34 | 1 3 3 1 1 | -1-3-3-1-1 |
| 35 | 3 1 3 1 1 | -3-1-3-1-1 |
| 36 | 3 3 1 1 1 | -3-3-1-1-1 |
| 37 | 3 3 3-1 1 | -3-3-3 1-1 |
| 38 | 1 3 3 3-1 | -1-3-3-3 1 |
| 39 | 3 1 3 3-1 | -3-1-3-3 1 |
| 40 | 3 3 1 3-1 | -3-3-1-3 1 |
| 41 | 3 3 3 1-1 | -3-3-3-1 1 |
| 42 | 1 3 3 3 1 | -1-3-3-3-1 |
| 43 | 3 1 3 3 1 | -3-1-3-3-1 |
| 44 | 3 3 1 3 1 | -3-3-1-3-1 |
| 45 | 3 3 3 1 1 | -3-3-3-1-1 |
| 46 | -3 1 3 3 1 | 3-1-3-3-1 |
| 47 | -1-1 3 3 1 | 1 1-3-3-1 |
| 48 | -1 1 1 3 1 | 1-1-1-3-1 |
| 49 | 1-1 1 3 1 | -1 1-1-3-1 |
| 50 | -1 3-1 3 1 | 1-3 1-3-1 |
| 51 | 1 1-1 3 1 | -1-1 1-3-1 |
| 52 | 3-1-1 3 1 | -3 1 1-3-1 |
| 53 | -1 1 3 1 1 | 1-1-3-1-1 |
| 54 | 1-1 3 1 1 | -1 1-3-1-1 |
| 55 | -1 3 1 1 1 | 1-3-1-1-1 |
| 56 | 3-1 1 1 1 | -3 1-1-1-1 |
| 57 | 1 3-1 1 1 | -1-3 1-1-1 |
| 58 | 3 1-1 1 1 | -3-1 1-1-1 |
| 59 | -1 3 3-1 1 | 1-3-3 1-1 |
| 60 | 1 1 3-1 1 | -1-1-3 1-1 |
| 61 | 3-1 3-1 1 | -3 1-3-1-1 |
| 62 | 1 3 1-1 1 | -1-3-1-1-1 |
| 63 | 3 1 1-1 1 | -3-1-1 1-1 |
| 64 | 3 3-1-1 1 | -3-3 1 1-1 |
| 65 | 3 3 1-3 1 | -3-3-1 3-1 |
| 66 | -1 1 3 3-1 | 1-1-3-3 1 |
| 67 | 1-1 3 3-1 | -1 1-3-3 1 |
| 68 | -1 3 1 3-1 | 1-3-1-3 1 |
| 69 | 1 1 1 3-1 | -1-1-1-3 1 |
| 70 | 3-1 1 3-1 | -3 1-1-3 1 |
| 71 | 1 3-1 3-1 | -1-3 1-3 1 |
| 72 | 3 1-1 3-1 | -3-1 1-3 1 |
| 73 | -1 3 3 1-1 | 1-3-3-1 1 |
| 74 | 1 1 3 1-1 | -1-1-3-1 1 |
| 75 | 3-1 3 1-1 | -3 1-3-1 1 |
| 76 | 1 3 1 1-1 | -1-3-1-1 1 |
| 77 | 3 1 1 1-1 | -3-1-1-1 1 |
| 78 | 3 3-1 1-1 | -3-3 1-1 1 |
| 79 | 1 3 3-1-1 | -1-3-3 1 1 |
| 80 | 3 1 3-1-1 | -3-1-3 1 1 |
| 81 | -1-3 1 3 1 | |
| 82 | | 1 3-1-3-1 |
| 83 | -1-1-1 3 1 | |
| 84 | 1-3-1 3 1 | |
| 85 | -3-1 3 1 1 | |
| 86 | -3 1 1 1 1 | |
| 87 | | 1 1 1-3-1 |
| 88 | | -1 3 1-3-1 |
| 89 | | 3 1-3-1-1 |
| 90 | | 3-1-1-1-1 |
| 91 | 1-3 1 1 1 | |
| 92 | -1 1-1 1 1 | |
| 93 | 1-1-1 1 1 | |
| 94 | 1 1-3 1 1 | |
| 95 | 3-1-3 1 1 | |
| 96 | -3 1 3-1 1 | |
| 97 | -1-1 3-1 1 | |
| 98 | | -1 3-1-1-1 |
| 99 | | 1-1 1-1-1 |
| 100 | | -1 1 1-1-1 |
| 101 | | -1-1 3-1-1 |
| 102 | | -3 1 3-1-1 |
| 103 | | 3-1-3 1-1 |
| 104 | | 1 1-3 1-1 |
| 105 | -1 3-1-1 1 | |
| 106 | | 1-3 1 1-1 |
| 107 | 3-1-1-1 1 | |
| 108 | 3 1-3 1 1 | |
| 109 | -1 3 1-3 1 | |
| 110 | 1 1 1-3 1 | |
| 111 | 3 1 1-3 1 | |
| 112 | 1 3-1 3 1 | |
| 113 | 3 1-1 3 1 | |
| 114 | -3 1 3 3-1 | |
| 115 | -3 1 1 3-1 | |
| 116 | -1-1 1 3-1 | |
| 117 | 1-3 1 3-1 | |
| 118 | -1 1-1 3-1 | |
| 119 | 1-1-1 3-1 | |
| 120 | -3 1 3 1-1 | |
| 121 | -1-1 3 1-1 | |
| 122 | -1 1 1 1-1 | |
| 123 | 1-1 1 1-1 | |
| 124 | -1 3-1 1-1 | |
| 125 | 1 1-1 1-1 | |
| 126 | 3-1-1 1-1 | |
| 127 | 3 1-3 1-1 | |
| 128 | -1 1 3-1-1 | |
| 129 | 1-1 3-1-1 | |
| 130 | -1 3 1-1-1 | |
| 131 | 1 1 1-1-1 | |
| 132 | 3-1 1-1-1 | |
| 133 | 1 3-1-1-1 | |
| 134 | 3 1-1-1-1 | |
| 135 | 1 3 1-3-1 | |
| 136 | 3 1 1-3-1 | |
| 137 | 3 3-1-3-1 | |
| 138 | | -3 1 1 1-1 |
| 139 | | -3-1 3 1-1 |
| 140 | | 1-3-1 3-1 |
| 141 | | -1-1-1 3-1 |
| 142 | | -3 1-1 3-1 |
| 143 | | -1-3 1 3-1 |
| 144 | | -3-1 1 3-1 |
| 145 | | 3 1-3 3 1 |
| 146 | | 3-1-1-3 1 |
| 147 | | 1 1-1-3 1 |
| 148 | | -1 3-1-3 1 |
| 149 | | 1-1 1-3 1 |
| 150 | | -1 1 1-3 1 |
| 151 | | 3-1-3 1 1 |
| 152 | | 1 1-3-1 1 |
| 153 | | 1-1-1-1 1 |
| 154 | | -1-1-1 1 1 |
| 155 | | 1-3 1-1 1 |
| 156 | | -1-1 1-1 1 |
| 157 | | -3 1 1-1 1 |

TABLE 1-continued

8B5QSMB Code Assignment

| Decimal Code | Q Code RDS > 0 | Q Code RDS < 0 |
|---|---|---|
| 158 |  | -3-1 3-1 1 |
| 159 |  | 1-1-3 1 1 |
| 160 |  | -1 1-3 1 1 |
| 161 |  | 1-3-1 1 1 |
| 162 |  | -1-1-1 1 1 |
| 163 |  | -3 1-1 1 1 |
| 164 |  | -1-3 1 1 1 |
| 165 |  | -3-1 1 1 1 |
| 166 |  | -1-3-1 3 1 |
| 167 |  | -3-1-1 3 1 |
| 168 |  | -3-3 1 3 1 |
| 169 | -3-1 3 3 1 |  |
| 170 | -3 1 1 3 1 |  |
| 171 | -1-1 1 3 1 |  |
| 172 | 1-3 1 3 1 |  |
| 173 | -1 1-1 3 1 |  |
| 174 | 1-1-1 3 1 |  |
| 175 | -3 1 3 1 1 |  |
| 176 | -1-1 3 1 1 |  |
| 177 | -1 1 1 1 1 |  |
| 178 | 1-1 1 1 1 |  |
| 179 | -1 3-1 1 1 |  |
| 180 | 1 1-1 1 1 |  |
| 181 | 3-1-1 1 1 |  |
| 182 | 3 1-3 1 1 |  |
| 183 | -1 1 3-1 1 |  |
| 184 | 1-1 3-1 1 |  |
| 185 | -1 3 1-1 1 |  |
| 186 | 1 1 1-1 1 |  |
| 187 | 3-1 1-1 1 |  |
| 188 | 1 3-1-1 1 |  |
| 189 | 3 1-1-1 1 |  |
| 190 | 1 3 1-3 1 |  |
| 191 | 3 1 1-3 1 |  |
| 192 | 3 3-1-3 1 |  |
| 193 | -3 1 3 3-1 |  |
| 194 | -1-1 3 3-1 |  |
| 195 | -1 1 1 3-1 |  |
| 196 | 1-1 1 3-1 |  |
| 197 | -1 3-1 3-1 |  |
| 198 | 1 1-1 3-1 |  |
| 199 | 3-1-1 3-1 |  |
| 200 | -1 1 3 1-1 |  |
| 201 | 1-1 3 1-1 |  |
| 202 | -1 3 1 1-1 |  |
| 203 | 1 1 1 1-1 |  |
| 204 | 3-1 1 1-1 |  |
| 205 | 1 3-1 1-1 |  |
| 206 |  | 3 1-3-3-1 |
| 207 |  | 3-1-1-3-1 |
| 208 |  | 1 1-1-3-1 |
| 209 |  | -1 3-1-3-1 |
| 210 |  | 1-1 1-3-1 |
| 211 |  | -1 1 1-3-1 |
| 212 |  | 3-1-3-1-1 |
| 213 |  | 1 1-3-1-1 |
| 214 |  | 1-1-1-1-1 |
| 215 |  | -1 1-1-1-1 |
| 216 |  | 1-3 1-1-1 |
| 217 |  | -1-1 1-1-1 |
| 218 |  | -3 1 1-1-1 |
| 219 |  | -3-1 3-1-1 |
| 220 |  | 1-1-3 1-1 |
| 221 |  | -1 1-3 1-1 |
| 222 |  | 1-3-1 1-1 |
| 223 |  | -1-1-1 1-1 |
| 224 |  | -3 1-1 1-1 |
| 225 |  | -1-3 1 1-1 |
| 226 |  | -3-1 1 1-1 |
| 227 |  | -1-3-1 3-1 |
| 228 |  | -3-1-1 3-1 |
| 229 |  | -3-3 1 3-1 |
| 230 |  | 3-1-3-3 1 |
| 231 |  | 1 1-3-3 1 |
| 232 |  | 1-1-1-3 1 |
| 233 |  | -1 1-1-3 1 |
| 234 |  | 1-3 1-3 1 |
| 235 |  | 1-1 1-3 1 |
| 236 |  | -3 1 1-3 1 |
| 237 |  | 1-1-3 1 1 |
| 238 |  | -1 1-3-1 1 |
| 239 |  | 1-3-1 1 1 |
| 240 |  | -1-1-1-1 1 |
| 241 |  | -3 1-1-1 1 |
| 242 |  | -1-3 1-1 1 |
| 243 | -1 3 3-1-1 |  |
| 244 | 1 1 3-1-1 |  |
| 245 | 3-1 3-1-1 |  |
| 246 | 1 3 1-1-1 |  |
| 247 | 3 1 1-1-1 |  |
| 248 | 3 3-1-1-1 |  |
| 249 | 3 3 1-3-1 |  |
| 250 |  | 1-3-3 1 1 |
| 251 |  | -1-1-3 1 1 |
| 252 |  | -3 1-3 1 1 |
| 253 |  | -1-3-1 1 1 |
| 254 |  | -3-1-1 1 1 |
| 255 |  | -3-3 1 1 1 |
| 256 |  | -3-3-1 3 1 |

TABLE 2

Special Characters ("K" Codes) and Supported "K" Codes

| Code | Description | Binary Value <7:0> | Q code Q4<1:0>-Q0<1:0> RDS > 0 | Q code Q4<1:0>-Q0<1:0> RDS < 0 |
|---|---|---|---|---|
| Special Characters |  |  |  |  |
| K 28.0 | Skip (aka Idle, aka ‖R‖) | 0 0 0 1 1 1 0 0 | -3 1-1 3 1 | 3-1 1-3-1 |
| K 28.5 | Sync (aka Idle, aka ‖K‖) | 1 0 1 1 1 1 0 0 | -1-1 1 1 1 | 1 1-1-1-1 |
| K 27.7 | Start | 1 1 1 1 1 0 1 1 | -1 1-1-1 1 | 1-1 1-1 1 |
| K 29.7 | Terminate | 1 1 1 1 1 1 0 1 | 1-1 1-1 1 | -1 1-1 1-1 |
| K 30.7 | Error | 1 1 1 1 1 1 1 0 | 1 1-1-1 1 | -1-1 1 1-1 |
| Accelerant Control Codes |  |  |  |  |
| SI-K 23.7 |  | 1 1 1 1 0 1 1 1 | 3 3 3 3-1 | -3-3-3-3 1 |
| Error |  | 1 1 1 1 1 1 1 1 | -1-1-1-1-1 | 1 1 1 1 1 |

Special codes (TABLE 2) are all mapped to balanced Q Code pairs. Both Q Codes have same symbol order, but each symbol has the opposite sign. The RDS of each Q Code is equal in magnitude but opposite in sign to the other. Each time a special code is transmitted the 9th bit of the scrambler selects the RDS value. When the scrambler bit is 1 the positive RDS valued Q Code will be transmitted. The RDS of the special code is added to the Q-Encoder data RDS adder. The SI code is to transmitted as a pair and is detected upon valid receipt of a successive pair.

The K23.7 is the 8B10B Carrier Extend K code. Whenever there is a lack of data to send the channel should be idled by sending random data. This is accomplished by simply providing any fixed pattern to the transmit user interface. This data will be scrambled and transmitted during the idle time. The back channel (i.e., information provided, determined and/or generated by the receiver module to adjust or modify output signal characteristics of the transmitter module which is coupled to the receiver module) will be preserved since the back channel code is among the codes that will result from scrambling.

FIG. 7 illustrates a set of example Q Codes used for various transmitted bit patterns in a communications system according to another embodiment of the present invention. Q Codes correspond to the set of signal values transmitted over the channel that correspond to a byte of transmitted data. In this example, the transmitted data corresponds to an eight bit byte of data having values that range between 0 (00(hex)) and 255 (FF(hex)). When a particular bit pattern is to be transmitted through the channel, the corresponding Q Code is serially sent as five, two-bit symbols.

Specifically, the sparsely populated nine bit word space is constructed such that all entries in the space from 0 to 255 (000(hex) to 0FF(hex)) are fully represented, this space being the user data space. However, the remaining portion of the space, which ranges from 256 to 511 (100(hex) to 1FF(hex)), has between 128 and 6 valid entries, this space being the control space. Thus, even though one can represent 512 unique phrases in nine bits of data, in the code space to be described below, only 262 to 384 phrases are encoded into valid Q Codes; the remaining phrases in the 9-bit word space are all mapped into one invalid Q Code.

For an example of the encoding process, if a bit pattern 167 (A7(hex)) is transmitted, a Q Code "−3 −3 +1 +3 +1" is sent over the channel. For this particular bit pattern, only one Q Code can be used. As such, the transmitter received the bit pattern 167 (A7(hex)), determines the above Q Code and schedules the five symbol values, associated with 167, to be transmitted over the next five symbol times. The receiver then assembles the Q Code sent over the channel during the five symbol time periods, recognizes it as the Q Code for bit pattern 167 (A7), and outputs the corresponding bit pattern.

For other bit patterns, such as 0 (00(hex)) or 21 (15(hex)), two different Q Codes are used. The two Q Codes chosen to represent the 9-bit word are constructed such that one Q Code can be converted into the other Q Code by multiplication with "−1". Such constructed codes are referred to as balanced codes. For all balanced bit patterns except 0 (00(hex)), these two different Q Codes are used for a single bit pattern as a mechanism to keep the observed RDS value close to zero. This result is achieved by using the currently observed RDS value to determine which of the two Q Codes are to be transmitted for a given bit pattern.

For example, a first Q Code corresponding to signal values of "+3 +3 −1 +3 −1" is used to send a bit pattern of 22 (16(hex)) when the observed RDS of the channel is greater than 0. A second Q Code corresponding to signal values of "−3 −3 +1 −3 +1" is used to send the same bit pattern of 22 (16(hex)) when the observed RDS of the channel is than less 0. The transmitter maintains a running RDS value beginning upon reset of the transmitter that is used to select which of these two Q Codes are sent. The receiver decodes both Q Codes of a balanced pair as the same user data and does not have to maintain an RDS sum. This process attempts to force the observed RDS value back to zero, and thus reduces or eliminates any localized DC offset observed in the channel by sending a symbol with an offsetting RDS symbol value when the running sum is not zero.

The Q Codes for bit pattern 0 (00(hex)) are used to transmit a single bit of back channel data along with user data instead of attempting to correct an observed DC offset. When a bit pattern of 0 (00(hex)) is to be transmitted, the next back channel bit to be transmitted is used to select the Q Code that is to be transmitted—independent of the RDS. When the next back channel bit has a logic value of 1, the Q Code corresponding to a RDS>0 is used, i.e., −3 −1 +1 +3 +1. Similarly, when the next back channel bit has a logic value of 0, the Q Code corresponding to a RDS<0 is used, i.e., +3 +1 −1 −3 −1. Using this process, a packet of back channel data is asynchronously transmitted one bit at a time whenever a Q Code for bit pattern 0 (00(hex)) is sent.

It is possible to map the special bit pattern for 0 (00(hex)) into n different Q Codes so as to transmit log(n)/log(2) different back channels bits at a time. Furthermore, more than one special bit pattern can be chosen for the purpose of back channel communication—providing either larger aggregate back channel bandwidth, or the creation of multiple and separate back channels for uses beyond simple adaption. Finally, the choice of the special bit pattern being 0 (00(hex)) is completely arbitrary and should in no way be considered to limit the scope of possibilities claimed by this invention. Any bit pattern may be used as the special bit pattern so long as said pattern has some regularity of occurrence within the normally transmitted stream of data.

Figure 8:
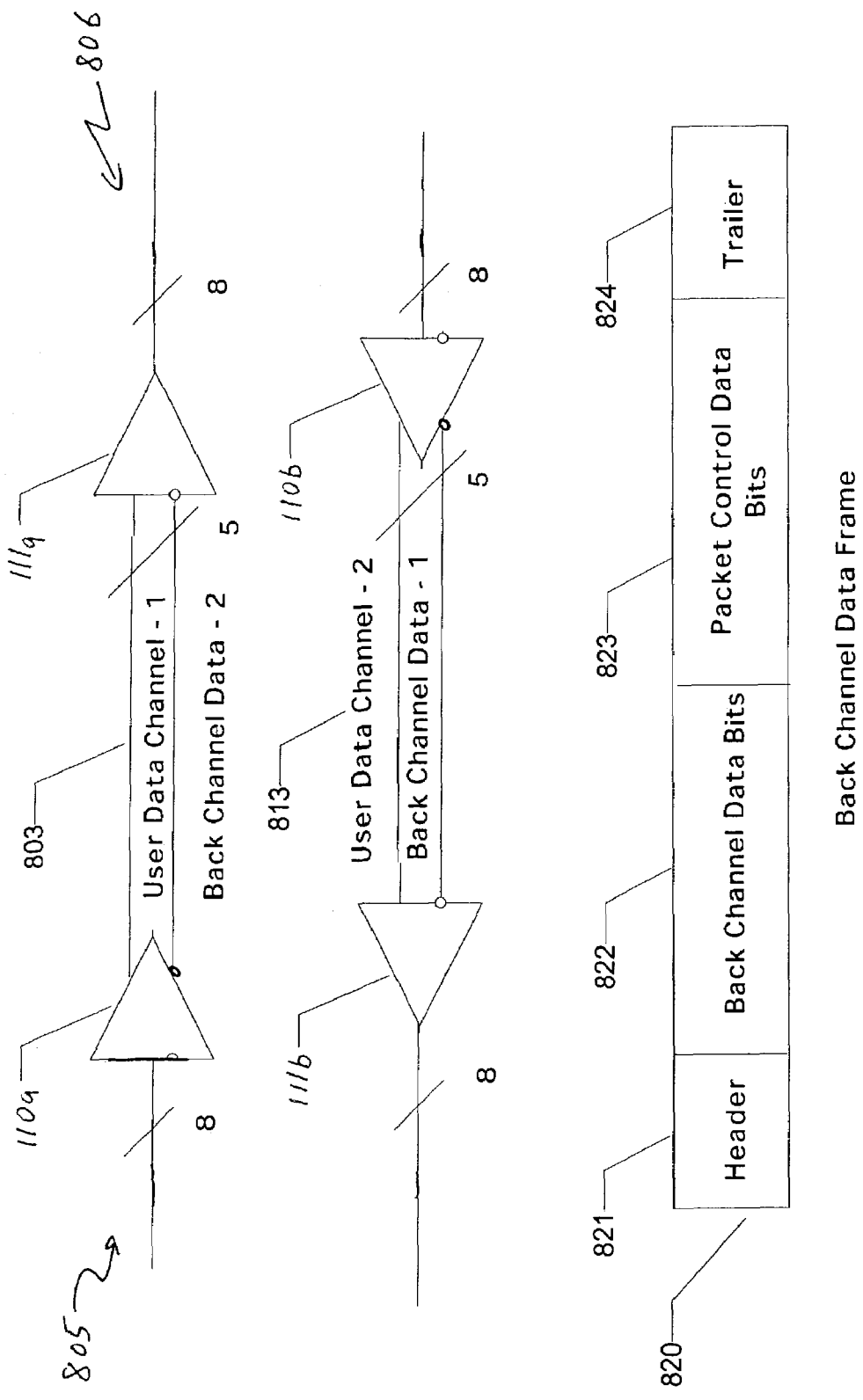
FIG. 8 illustrates a back channel communications path that is part of a user data channel in accordance with another embodiment of the present invention.

In accordance with another aspect of the present invention, the back channel communications path may be part of the user data channel. With reference to FIG. 8, the channel 100 is typically bounded by two sets of unidirectional transmitter and receiver pairs, for example, transmitter 110a and receiver 111a and transmitter 111b and receiver 111b. In one embodiment, transmitter 110a and receiver 111b are incorporated into transceiver 805. Similarly, transmitter 110b and receiver 111a are incorporated into transceiver 806. In operation, the transmitter and receiver pairs simultaneously transmit data across channel 100. Using the above back channel data encoding, back channel data may be transmitted asynchronously at the same time user data is transmitted without reducing the amount of channel communications capacity dedicated to user data.

The back channel data is typically sent in a back channel data frame or data packet 820. In one embodiment, data frame 820 includes frame header 821, a set of data bits 822, a set of control bits 823, and data frame trailer 824. The frame header 821 is used to mark the beginning of a data frame to allow the transmitter and receiver to remain synchronized as to the proper beginning of the data frame. The set of data bits 822 contains the data to be transmitted across the back channel and is distinguished from the set of control bits 823 used to control the operation of the back channel as necessary. Finally, data frame trailer 824 is used to mark the end of a data frame to further allow the transmitter and receiver to remain synchronized as to the proper end of the data frame.

It should be noted that other message formats and features, such as error correction or detection, may be implemented in the back channel frame. Indeed, any and all formats, whether now known or later developed, are intended to be within the scope of the present invention. Moreover, it is possible to construct an arbitrarily complex frame for the back channel information and have the frame carried by the sub channel described herein.

Figure 9:
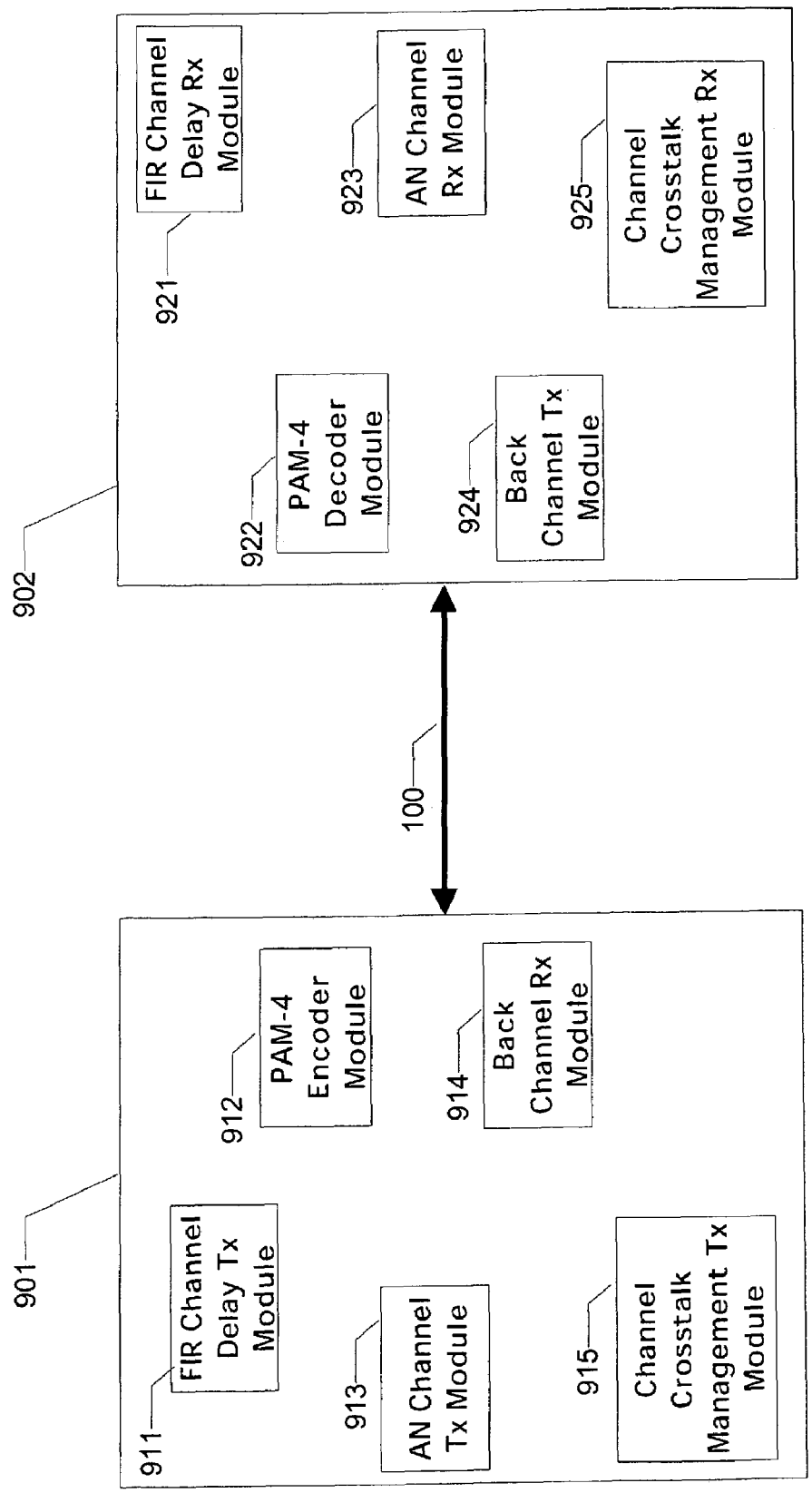
FIG. 9 illustrates a simplified transmitter and receiver module pair communicating over a channel according to an exemplary embodiment of the present invention.

FIG. 9 illustrates a simplified transmitter and receiver module pair communicating over a backplane communications channel according to an embodiment of the present invention. Each backplane transceiver 901, 902 comprises transmitter and receiver pairs consisting of a set of complementary processing modules that perform the operations necessary to configure and operate the communications system according to the present invention. These complementary module pairs include: a Tx FIR channel equalizer module and Rx module pair 911, 921, a PAM-4 encoder module 912 and a PAM-4 decoder module 922, an Auto-Negotiation (AN) Tx and Rx module pair 913, 923, a back channel Rx and Tx module pair 914,924.

The Tx FIR channel equalizer module 911 performs processing associated with the operation of multiple filtering modules within the Tx module to properly shape PAM-4 signals to optimize the PAM-4 signal waveform arriving at the Rx module, 921. The function of the transmit equalizer module, which is adaptive or adjustable, is to compensate for dielectric loss, skin effect, reflections and/or other distortions that plague high-speed backplane communications channels. The Tx FIR channel equalizer comprises filtering modules to realize a symbol tap and a variety of other taps with varying weights and delays.

In a preferred embodiment, the taps of the Tx FIR channel equalizer are continuously or periodically adapted and are controlled via a back channel by the opposing receiver. Additional details regarding the structure and operation of the module pair are found in U.S. Provisional Patent Application Ser. No. 60/313,478 entitled "Variable Delay FIR Equalizer for Serial Baseband Communications", filed Aug. 20, 2001, and non-provisional patent application entitled "System and Method for Providing Variable Delay FIR Equalizer for Serial Baseband Communications", filed Aug. 16, 2002 . As mentioned above, these applications are incorporated by reference herein in their entirety.

The Rx module 921 performs the function of correctly capturing and slicing the optimized received signal. Further details regarding the receiver module are presented in U.S. Provisional Patent Application Ser. No. 60/313,455 entitled "Automatic Slicer Level Adaption", filed Aug. 20, 2001, and non-provisional patent application entitled "System and Method for Providing Slicer Level Adaption", filed Aug. 16, 2002 . As mentioned above, these applications are incorporated by reference herein in their entirety.

The PAM-4 encoder module 912 and PAM-4 decoder module 922 perform operations associated with the encoding and decoding of symbols using a PAM-4 coding technique. The PAM-4 coding technique may be done by directly mapping bits to PAM-4 symbols with no overhead or may be performed using a coding table which incorporates overhead (redundancy) which allows for additional physical layer control of the transmitted signal. In our preferred embodiment, we utilize a coding table and additional processing to maintain control of the DC value of the line.

Additional details regarding the operation of the module pair are found in U.S. Provisional Patent Application Ser. No. 60/313,476 entitled "Method and Apparatus for Encoding and Decoding Digital Communications Data", filed Aug. 20, 2001 and non-provisional patent application entitled "Method and Apparatus for Encoding and Decoding Digital Communications Data", filed Aug. 16, 2002. These applications are incorporated by reference herein in their entirety.

In the preferred embodiment, the Tx equalizer coefficients are converged in a loop whereby the receiver of each unit calculates which coefficients of the far end Tx equalizer make the received signal as good as possible and then these coefficients are transmitted back to the far end Tx (using a back channel). The AN channel Tx and Rx module pair 913, 923 perform the processing associated with the module pair initialization and auto-negotiation process as described in additional detail below.

The AN procedure is important in that at startup neither module's Tx equalizer is converged and the distortion arising from dielectric loss, skin effect and reflections makes reliable high speed data transmission of coefficient information from one unit back to the other unit difficult or not practical. Therefore, an initialization process called the Auto-Negotiation (AN) procedure at startup.

During an AN process or procedure, coefficient update information is sent to the module whose equalizer is being converged using a repetition code (holding each symbol for many periods to make a "longer" symbol AN symbol and using these symbols in conjunction with a special set of AN code words). This reduces the transmission bandwidth of the coefficient information to a frequency that is low enough that distortion is not a problem. The receiver of the unit whose transmit equalizer is being converged slices the AN code words that represent the coefficient information at the full symbol rate. This allows us to have multiple samples of each AN symbol. A majority vote on each over-sampled AN repetition symbol is used to make decision on the value of the AN symbol. This improves the SNR of the decision and reduces susceptibility to crosstalk. Additionally, over-sampling is advantageous in that the receiver of the unit receiving the coefficient information does not need to acquire timing. Note that the unit whose equalizer is being converged transmits back at the full symbol rate so as to guarantee that its coefficients will be chosen to equalize for distortion across the entire bandwidth of the channel.

Figure 10:
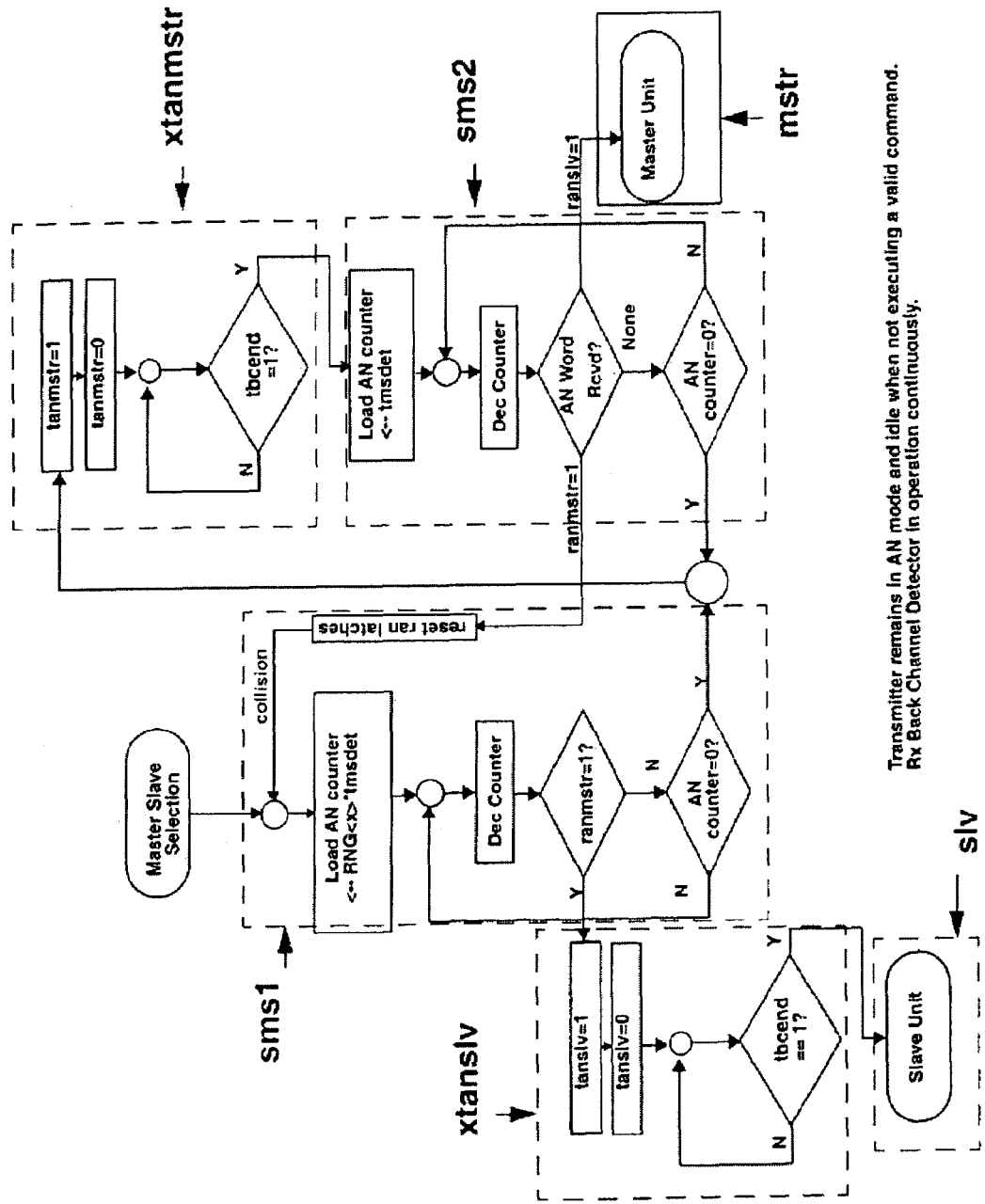
FIG. 10 illustrates an operational flow diagram for a master/slave selection process for a transmitter and receiver module pair in accordance with another embodiment of the present invention.

The determination of which transmitter unit's equalizer is to be converged first can be self-handled using a contention algorithm. An exemplary algorithm is illustrated in FIG. 10. In this regard, FIG. 10 illustrates an operational flow diagram for a finite state machine within a transmitter and receiver module pair communicating over a channel. During this procedure both units transmit using AN code words to establish a master unit and a slave unit. In this embodiment, the master unit is first to converge the equalizer of the far end transmitter (slave unit). Other procedures such as permanently assigning master/slave status, allowing master/slave to be controlled externally via software, processor, or higher layer network functions may also be employed.

Figure 11:
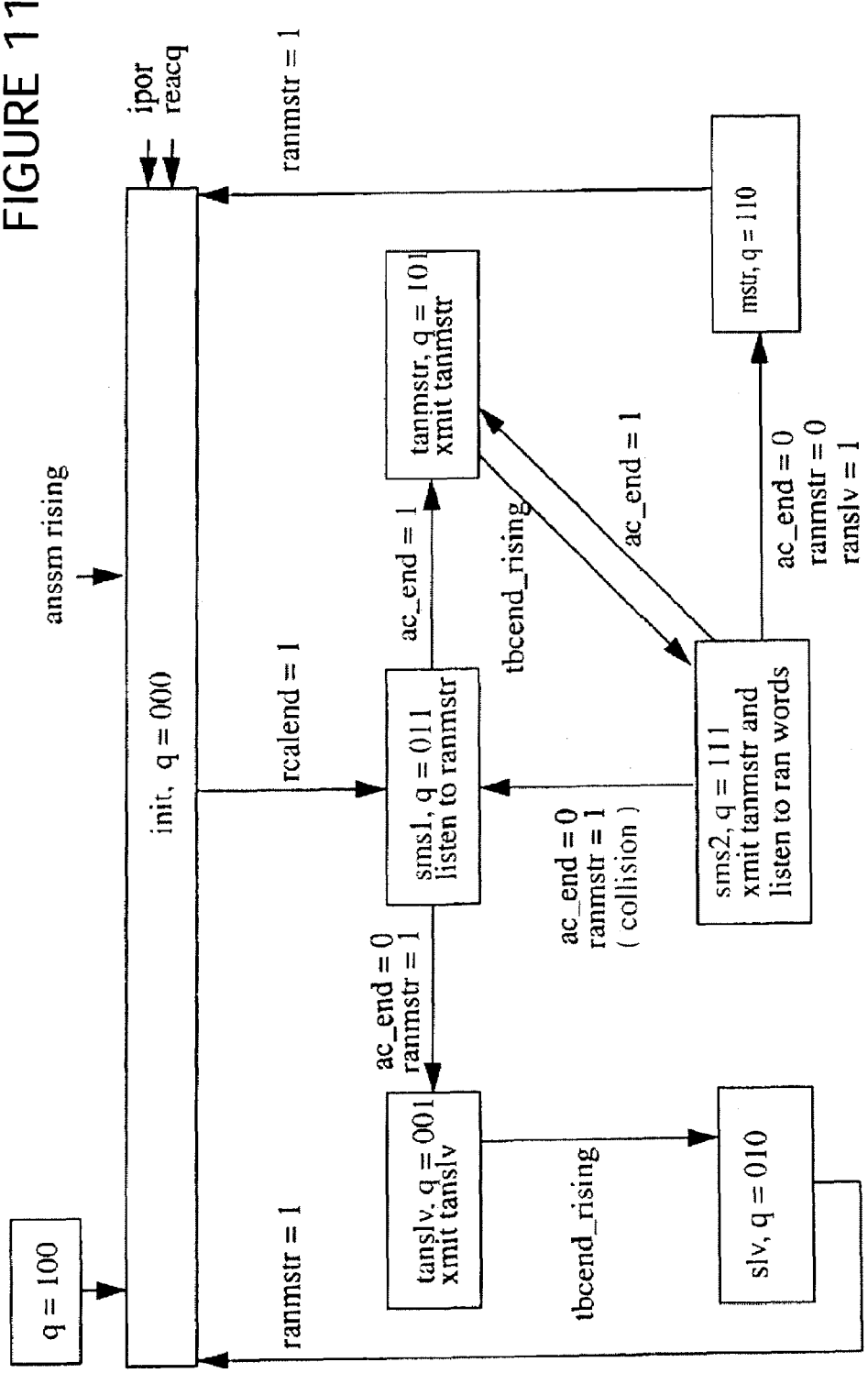
FIG. 11 illustrates an operational flow diagram for a finite state machine incorporated within a transmitter and receiver module pair that communicates over a channel in accordance with an embodiment of the present invention.
Figure 13:
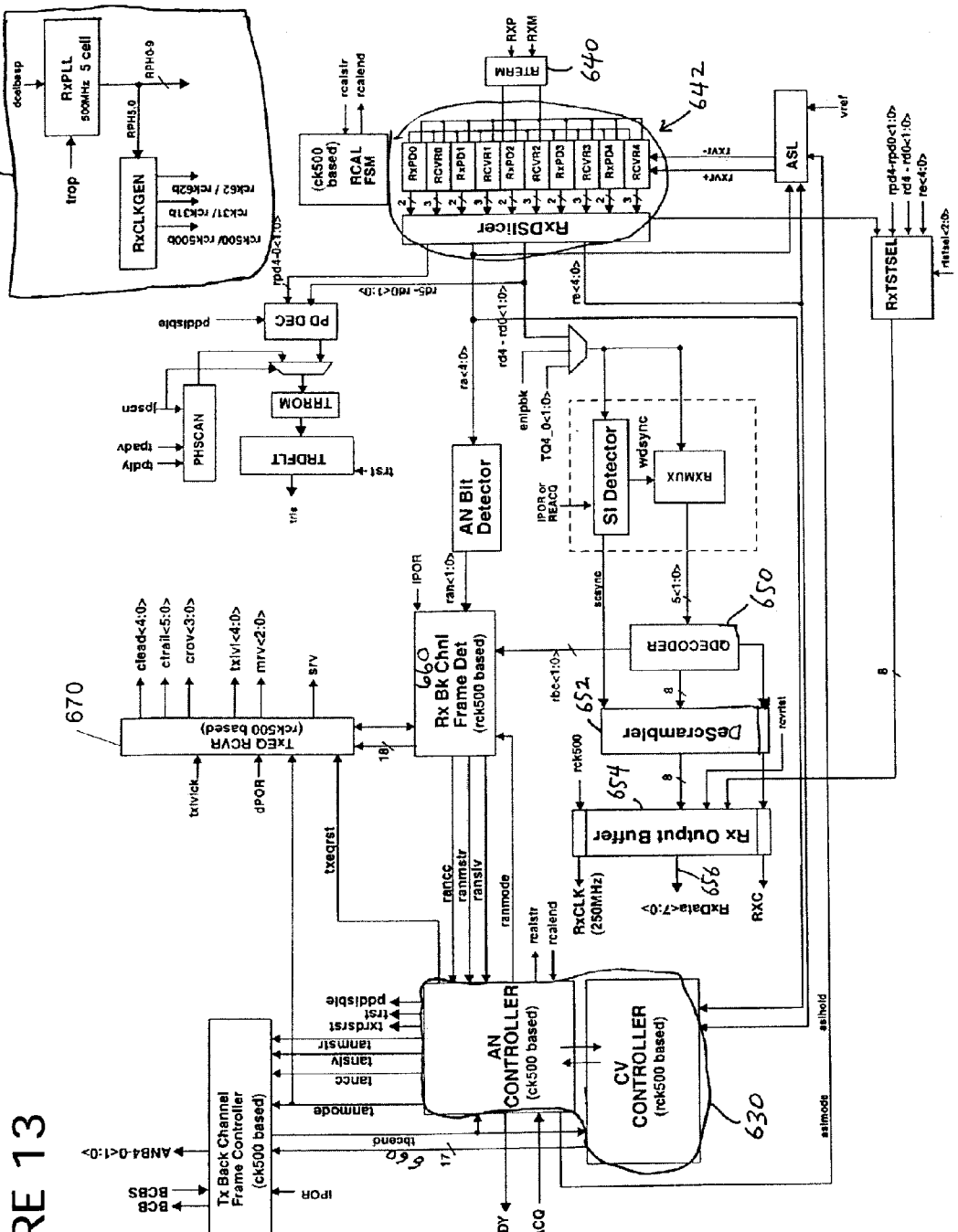
FIG. 13 is a diagram representation of a receiver module according to an embodiment of the present invention.

FIG. 11 illustrates an operational flow diagram for a finite state machine that is used at the onset of the AN procedure to determine which transceiver is the master unit and which is the slave unit. The finite state machine resides within a transmitter and receiver module pair communicating over a channel according to an example embodiment of the present invention. This module may be part of receiver module 630 as illustrated in FIG. 13.

It should be noted that the AN procedure or protocol is also described in detail in U.S. Provisional Patent Application Ser. No. 60/313,454, entitled "Transceiver System for High Speed Digital Signaling", filed Aug. 20, 2001. As mentioned above, this application is incorporated herein by reference in its entirety.

Figure 12:
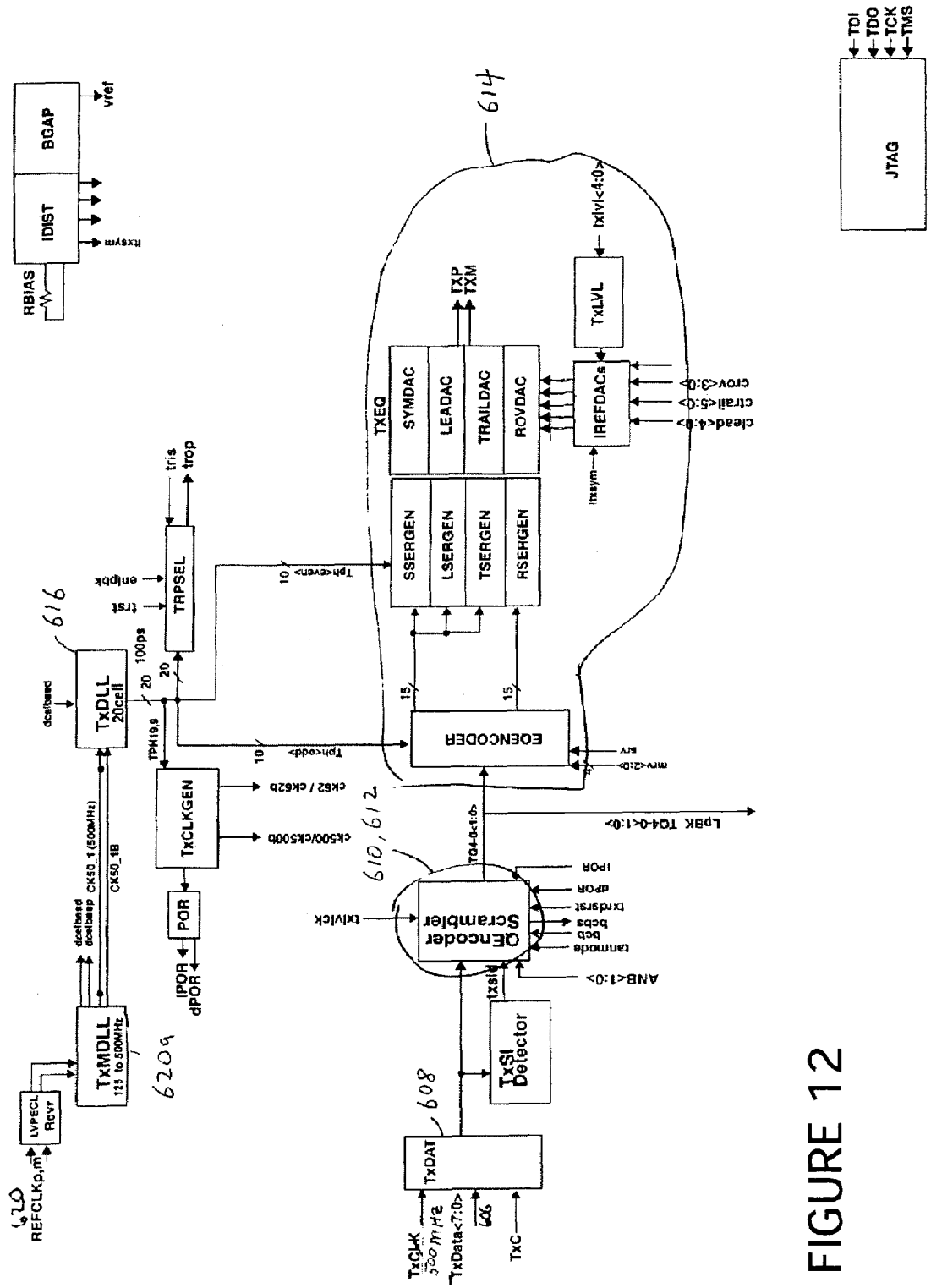
FIG. 12 is a block diagram representation of a transmitter module according to an embodiment of the present invention.

With reference to FIG. 12, the transmitter receives parallel data TxData<7:0> receives that parallel input data on an input bus 606. This "user data" is stored in the data input buffer 608, responsive to a clock signal TxCLK. User data is read from the data input buffer 608 into a Q-Encoder/scrambler 610, where the data is scrambled so that the resulting data exhibits certain desirable characteristics or, conversely, does not exhibit certain undesirable characteristics, for example, spectral spikes. The scrambled user data is input to an encoder 612 for coding the data into a series of symbols for transmission over the channel.

In one embodiment, an 8B5Q coding is used which, as the name implies, translates each 8 bit byte of scrambled user data into 5 quaternary (PAM-4) symbols. The PAM-4 baseband signal can be thought to have normalized signal levels of −3, −1, +1, and +3. The encoded symbols are input to transmit equalizer/multiplexer module 614, further described below, which in turn drives the data onto the channel 615. The transmit equalizer module 614 is controlled by delay lock loop (DLL) 616. The DLL 616 receives a reference clock from multiplying DLL 620 (TxMDLL). In operation, as explained in detail below, the transmit equalizer tap coefficients are adjusted to adapt to the channel in use for optimal or enhanced response at the corresponding receiver.

With reference to FIG. 13, a differential pair of conductors forming a receive channel 640 are input to receiver/slicer circuit 642. The receiver/slicer circuit 642 "slices" the received signal magnitude into multiple bands defined by the line coding in order to recover the transmitted signals. Thus, in one example of a PAM-4 embodiment, using levels −3, −1, +1 and +3, the slicer partitions the input signal at levels −2, 0 and +2. An input symbol having a magnitude greater than 2 is assumed to be level +3; and input symbol with a level below −2 is assumed to be the −3. A symbol at a level greater than 0 but less than +2 is assumed to be a +1, and finally, a symbol that is less than 0 but greater than −2 is assumed to be a level −1. In this way, the slicer recovers the four-level code symbols. This technique is merely illustrative; other block coding techniques and slicers could be used in connection with the present invention. Indeed, all types or forms of block coding techniques and slicers, whether now known or later developed, are intended to be within the scope of the present invention.

The four-level symbols are input to the 8B5Q decoder 650 to recover the scrambled user data. Each set of five symbols is decoded to form one binary symbol ("byte") of scrambled user data. The data is then descrambled in a descrambler 652 and then sorted in a data output buffer 654. The output buffer provides the received user data in a convenient format such as 8-bit wide words on bus 656. The receiver/slicer 642 is clocked by a phase lock loop circuit 646, which is synchronized to the received signals in order to sample the analog signal at the center of each symbol time.

The auto-negotiation circuit 630 interacts with both the transmitter and receiver portions of FIG. 6. Specifically, the AN-FSM receives information from the decoder 650 via path 660, and it inputs information to the transmit equalizer 614 via path 662.

The back channel receiver (Rx) and transmitter (Tx) module pair 914,924, perform processing associated with the operation of transmitter/receiver modules used to create a back channel communications path between the receiver and the transmitter. Additional details regarding the operation of the receiver and transmitter pair are found in U.S. Provisional Patent Application Ser. No. 60/313,456 entitled "Variable Rate Sub-Channel Using Block Code RDS", filed Aug. 20, 2001, and non-provisional patent application entitled "System and Method for Embedding a Sub-Channel in a Block Coded Data Stream", filed Aug. 16, 2002. As mentioned above, these applications are incorporated by reference herein in their entirety.

Finally, the channel crosstalk management Tx and Rx module pair perform processing associated with the operation of transmitter/receiver equalization within the transmitter and receiver to increase the likelihood that a transmitted signal is correctly decoded based upon receiving pulses from transmitter modules. Additionally, the transmit amplitude control achieved during the AN process may optimize or enhance the dynamic range at the receiver. Additional details regarding the operation of the module pair are found in U.S. Provisional Patent Application Ser. No. 60/313,477 entitled "Crosstalk Management for High-Speed Signaling Links", filed Aug. 20, 2001, and non-provisional patent application entitled "System and Method for Providing Crosstalk Management for High-Speed Signaling Links", filed Aug. 16, 2002. These applications are incorporated by reference herein in their entirety.

FIG. 1 illustrates an exemplary operating environment in which the present invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments and data communication systems that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed.

A processing device coupled to a communications channel 100 (via transceivers) typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" may be characterized as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein may be implemented (in part) as logical operations performed-by programmable processing devices. The logical operations of these various embodiments of the present invention are implemented (1) as a sequence of computer implemented steps or program modules running on a computing system and/or (2) as interconnected machine modules or hardware logic within the computing system. Accordingly, the logical operations making up the embodiments of the invention described herein can be variously referred to as operations, steps, or modules.

While the above embodiments of the present invention describe a communication system including transceivers for high speed digital signaling, one skilled in the art will recognize that the use of a particular encoding technique, a use of a particular back channel arrangement and a particular filtering technique are merely example embodiments of the present invention. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. A communication system for providing data communication, the system comprises:
  a plurality of links, wherein each link includes:
    a backplane;
    transmitter circuitry, coupled to the backplane, to transmit a data stream in a 4-level Pulse Amplitude Modulation (PAM-4) format on the backplane, wherein the transmitter circuitry includes:
      PAM-4 encoding circuitry to encode a plurality of bits of data into a PAM-4 representation thereof; and
      output driver circuitry, coupled to the PAM-4 encoding circuitry, to output the data stream on the backplane; and
    wherein the transmitter maintains a running data sum (RDS), which is used to select which code in a balanced code pair is to be transmitted for a given bit pattern in order to drive the RDS value to zero;
    receiver circuitry, coupled to the backplane, to receive the data stream transmitted by the transmitter circuitry, wherein the receiver circuitry includes:
      adaptive slicer circuitry, coupled to the backplane, to generate slicer output signals, having discrete amplitudes, which are representative of the data stream received by the receiver circuitry; and
      PAM-4 decoding circuitry, coupled to the adaptive slicer circuitry, to decode the slicer output signals into a plurality of bits of data; and
    equalization circuitry, wherein the equalization circuitry is controlled via a back channel.

2. The system of claim 1 farther including:
  a first transmitter circuitry and first receiver circuitry integrated on a first transceiver; and
  a second transmitter circuitry and second receiver circuitry integrated on a second transceiver, and
  wherein the plurality of links includes a first link including the first transmitter circuitry, a first backplane and the second receiver circuitry and a second link including the second transmitter circuitry, a second backplane and the first receiver circuitry.

3. The system of claim 2 wherein the first transmitter circuitry includes the equalization circuitry including at least one trailing tap, and wherein the second transmitter circuitry provides control information to the equalization circuitry of the first transmitter circuitry using a back channel that includes the second transmitter circuitry, the second backplane and the first receiver circuitry.

4. The system of claim 3 wherein the control information is representative of at least one coefficient of the at least one trailing tap.

5. The system of claim 4 wherein the second receiver circuitry calculates the at least one coefficient of the at least one trailing tap.

6. The system of claim 5 wherein the second receiver circuitry continually or periodically calculates the at least one coefficient of the at least one trailing tap.

7. The system of claim 1 wherein the transmitter circuitry of each link includes equalization circuitry each having a plurality of taps, and wherein the transmitter circuitry of a first link provides information which is representative of the coefficients of the taps to the equalization circuitry of the transmitter circuitry of a second link using a back channel.

8. The system of claim 7 wherein the receiver circuitry of the second link calculates coefficients of the plurality of taps of the equalization circuitry of the transmitter circuitry of the second link.

9. The system of claim 8 wherein the receiver circuitry of the second link continually or periodically calculates the coefficients of the plurality of taps of the equalization circuitry of the transmitter circuitry of the second link.

10. A communication system for providing data communication, the system comprises:
  a plurality of links, wherein each link includes:
    a backplane;
    transmitter circuitry, coupled to the backplane, to transmit a PAM-4 data stream on the backplane, wherein the transmitter circuitry includes:
      scrambling circuitry to scramble data;
      PAM-4 encoding circuitry, coupled to the circuitry, to encode the scrambled data into a PAM-4 representation thereof; and
      output driver circuitry, coupled to the PAM-4 encoding circuitry and scrambling circuitry, to output the PAM-4 data stream on the backplane; and
    wherein the transmitter maintains a running data sum (RDS), which is used to select which code in a balanced code pair is to be transmitted for a given bit pattern in order to drive the RDS value to zero;
    receiver circuitry, coupled to the backplane, to receive the PAM-4 data stream transmitted by the transmitter circuitry and to recover the plurality of bits of data, wherein the receiver circuitry includes:
      slicer circuitry, coupled to the backplane, to generate slicer output signals, having discrete amplitudes, which are representative of the PAM-4 data stream received by the receiver circuitry;
      PAM-4 decoding circuitry, coupled to the slicer circuitry, to decode the PAM-4 data stream into a binary representation thereof; and
      de-scrambling circuitry, coupled to the PAM-4 decoding circuitry, to unscramble the binary representation of the PAM-4 data stream; and
    equalization circuitry, wherein the equalization circuitry is controlled via a back channel.

11. The system of claim 10 wherein the slicer circuitry is adaptive.

12. A communication system for providing data communication, the system comprises:
  a plurality of links, wherein each link includes:
    a backplane;

transmitter circuitry, coupled to the backplane, to transmit a PAM-4 data stream on the backplane, wherein the transmitter circuitry includes:
  PAM-4 encoding circuitry to encode data into a PAM-4 representation thereto; and
  output driver circuitry, coupled to the PAM-4 encoding circuitry, to output a PAM-4 data stream on the backplane; and
wherein the transmitter maintains a running data sum (RDS) which is used to select which code in a balanced code pair is to be transmitted for a given bit pattern in order to drive the RDS value to zero;
receiver circuitry, coupled to the backplane, to receive the PAM-4 data stream transmitted by the transmitter circuitry and to recover the plurality of bits of data, the receiver circuitry including:
  PAM4 decoding circuitry to decode a representation of the PAM-4 data stream into a plurality of bits of data; and
  equalization circuitry, wherein the equalization circuitry is controlled via a back channel.

13. The system of claim 12 wherein the plurality of links includes:
  a first link including first transmitter circuitry, first receiver circuitry and a first backplane, wherein the first transmitter circuitry and the first receiver circuitry are integrated on a first transceiver; and
  a second link including second transmitter circuitry, second receiver circuitry and a second backplane, wherein the second transmitter circuitry and the second receiver circuitry are integrated on a second transceiver; and
  wherein the first transmitter circuitry is connected to the second receiver circuitry via the first backplane and the second transmitter circuitry is connected to the first receiver circuitry via the second backplane.

14. The system of claim 13 wherein the first transmitter circuitry includes the equalization circuitry including at least one trailing tap, and wherein the second transmitter circuitry provides control information to the equalization circuitry of the first transmitter circuitry using a back channel that includes the first receiver circuitry, the second transmitter circuitry and the second backplane.

15. The system of claim 14 wherein the control information is representative of at least one coefficient of the at least one trailing tap.

16. The system of claim 14 wherein the second receiver circuitry continually or periodically calculates the at least one coefficient of the at least one trailing tap.

17. The system of claim 16 wherein then second receiver continually or periodically calculates the at least one coefficient of the at least one trailing tap.

18. The system of claim 12 wherein the transmitter circuitry of each link includes equalization circuitry having a plurality of taps, and wherein the transmitter circuitry of a first link provides control information to the equalization circuitry of the transmitter circuitry of a second link using a back channel.

19. The system of claim 18 wherein the receiver circuitry of the second link calculates a set of coefficient of the taps of the equalization circuitry of the transmitter circuitry of the second link.

20. The system of claim 18 wherein the receiver circuitry of the second link continually or periodically calculates the set of coefficients of the taps of the equalization circuitry of the transmitter circuitry of the second link.

* * * * *